United States Patent
Zijlman et al.

(10) Patent No.: US 12,262,455 B2
(45) Date of Patent: Mar. 25, 2025

(54) LED DRIVER CIRCUIT (71) Applicant: SIGNIFY HOLDING B.V., Eindhoven (NL)

(72) Inventors: Theo Gerrit Zijlman, Tilburg (NL); Henricus Marius Joseph Maria Kahlman, Dongen (NL); Bertrand Johan Edward Hontele, Breda (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 114 days.

(21) Appl. No.: 18/030,878

(22) PCT Filed: Oct. 8, 2021

(86) PCT No.: PCT/EP2021/077902
§ 371 (c)(1),
(2) Date: Apr. 7, 2023

(87) PCT Pub. No.: WO2022/078906
PCT Pub. Date: Apr. 21, 2022

(65) Prior Publication Data
US 2023/0422371 A1 Dec. 28, 2023

(30) Foreign Application Priority Data
Oct. 16, 2020 (EP) .................................... 20202184

(51) Int. Cl.
*H05B 45/30* (2020.01)
*H05B 45/325* (2020.01)

(52) U.S. Cl.
CPC .................................. *H05B 45/325* (2020.01)

(58) Field of Classification Search
CPC ...... H05B 45/10; H05B 45/30; H05B 45/325; H05B 47/10
See application file for complete search history.

(56) References Cited

U.S. PATENT DOCUMENTS

| 10,582,579 B1* | 3/2020 | Milanesi ................ H05B 47/25 |
| 2013/0229120 A1* | 9/2013 | Choutov ................ H05B 45/10 315/186 |
| 2019/0327807 A1 | 10/2019 | Sauerlander et al. |

FOREIGN PATENT DOCUMENTS

| CN | 205546073 U | 8/2016 |
| CN | 210670677 U | 6/2020 |

OTHER PUBLICATIONS

Andrea Mazzatenta et al., "Pathologies currently identified by exhaled biomarkers", Respiratory Physiology & Neurobiology, 187 (2013) 128-134.

* cited by examiner

*Primary Examiner* — Jimmy T Vu (57) ABSTRACT

A LED driver circuit uses a first current source circuit to set an output current, controlled by pulse width modulation and a second current source circuit for charging a storage capacitor. A compensating arrangement is used for increasing the current delivered by the second current source circuit during off period times of the pulse width modulation. This compensates the current drawn from the input and enables better timing control of the input current pulses.

9 Claims, 7 Drawing Sheets

LED DRIVER CIRCUIT

CROSS-REFERENCE TO PRIOR APPLICATIONS

This application is the U.S. National Phase application under 35 U.S.C. § 371 of International Application No. PCT/EP2021/077902, filed on Oct. 8, 2021, which claims the benefit of European Patent Application No. 20202184.6, filed on Oct. 16, 2020. These applications are hereby incorporated by reference herein.

FIELD OF THE INVENTION

This invention relates to LED driver circuits.

BACKGROUND OF THE INVENTION

LED filament lamps are becoming increasingly popular due to their incandescent like lamp appearance.

These lamps have a high LED string voltage, and there are also size restrictions in that the lamp driver should fit in an Edison cap. To meet these requirements, linear low power factor current source drivers are used for supplying the filament LED strips. The current in these linear drivers can be amplitude controlled or pulse width modulation controlled (PWM dimming). Because of dimming accuracy and color point control, PWM control is preferred in these drivers, despite the resulting mains input current distortion.

The input current wave shape however needs to fulfill regulatory requirements, and this is difficult to achieve when implementing PWM dimming. In particular, the PWM dimming signal is a high frequency signal, for example a 1 kHz signal.

A known linear driver comprises a current source circuit in series with the LED string, for driving a fixed current through the LEDs. A storage capacitor is for example in parallel with the combined LED string and the series-connected current source circuit. The capacitor discharges to the LED string (at the fixed PWM controlled current) when the storage capacitor voltage is higher than a rectified mains input voltage, and the capacitor charges from the rectified mains input when the rectified mains input voltage is higher. During the charging phase, the current from the rectified mains also flows to the LED arrangement. Any modulation of the LED current contributes to mains current distortion.

It is known to control the charging of the storage capacitor using another (fixed) current source. This reduces the current distortion and improves the power factor. However, current distortion remains as a result of the fast switching frequency of the PWM control signal. The result is that the phase angle of the input current relative to the rectified mains is not well controlled, in particular the timing of a peak in the input current (a "peak angle") may result in regulatory requirements not being met.

SUMMARY OF THE INVENTION

The invention is defined by the claims.

According to examples in accordance with an aspect of the invention, there is provided a LED driver circuit comprising:
an input for receiving a rectified mains input signal;
a storage capacitor;
a first current source circuit for setting an output current, wherein the current source circuit is controlled by pulse width modulation with on periods and off periods, and wherein the first current source and the storage capacitor form a capacitor discharging loop;
a charging circuit for charging the storage capacitor, comprising a second current source circuit, wherein the second current source circuit and the storage capacitor form a capacitor charging loop; and
a compensating arrangement for increasing the current delivered by the second current source circuit during off period times of the pulse width modulation.

In this way, the compensating arrangement compensates for the time that the output is not drawing any current, by increasing the charging current of the second current source circuit.

The invention addresses the issue that the received rectified mains signal is not synchronized with the PWM control signal. The aim is to provide a circuit in which the current peaks occur at a fixed timing regardless of the timing offset between the mains frequency signal and the PWM signal.

The compensating arrangement is for example for increasing the current delivered by the second current source circuit during off period times of the pulse width modulation only while a current is being drawn from the input.

A current is drawn from the input during the operation of the capacitor charging loop, and no input current is drawn during the capacitor discharging loop. Thus, the input current comprises pulses at the rectified frequency. These pulses suffer from high frequency distortion resulting from the pulse width modulation of the first current source. The compensating arrangement ensures the peaks of these pulses occurs at the beginning of each pulse.

The compensating arrangement may comprise a coupling between the first and second current source circuits.

This coupling enables the charging current of the second current source circuit to be made variable and to depend on the state of the first current source circuit.

In one example, the first current source circuit comprises a first control input for setting a current level, based on the voltage across a first resistor between a ground terminal and the first control input, and the second current source circuit comprises a second control input for setting a current level, based on the voltage across a second resistor between a virtual terminal and the second control input, wherein the compensating arrangement comprises a coupling between the virtual ground terminal and the first control input.

Thus, the compensating function may be implemented simply as a coupling between the first and second current source circuits, in particular to adapt the control input to the second charge source circuit, thereby to make the current delivered dependent on the output current (which is the LED current).

In this way, the output current PWM distortion is compensated effectively by adding it to the control circuit (in particular the sense resistor) of the second current source circuit. In this way the distortion of the input current is compensated.

The sensed current flow used to control the first current source circuit is in this way provided to the control input for the second current source circuit (i.e. the charging loop), and thereby provide compensation in the analog control domain.

In another arrangement, the compensating arrangement comprises a compensating circuit for setting the current of the second current source in dependence on the pulse width modulation setting of the first current source circuit.

Thus, the pulse width modulation signal may be used to control the second current source circuit. This is simple to implement as it avoids any coupling between outputs of the first and second current source circuits, but only makes use of the same PWM signals.

The compensating circuit may comprise a transistor for pulling a control terminal of the second current source high or low in dependence on the pulse width modulation setting of the first current source circuit.

In another example, the first current source circuit comprises a first control input for setting a current level, based on the voltage across a first resistor between a ground terminal and the first control input, wherein the compensating arrangement comprises a compensating capacitor in parallel with the first resistor.

The addition of a compensating capacitor creates a filter circuit, in particular a differentiator circuit, and this shifts the peak of the input current to the start of the current waveform. Thus, the effect is to shift and increase the peak of the input current distortion such that the peak angle requirements are able to be met.

The first resistor and the compensating capacitor may form a circuit with a cutoff frequency greater than two times a PWM frequency.

The invention also provides a lighting arrangement comprising:
the driver circuit as defined above; and
a LED arrangement to which the output current is delivered.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a LED driver circuit which uses a first current source circuit to set an output current, controlled by pulse width modulation, and a second current source circuit for charging a storage capacitor. A compensating arrangement is used for increasing the current delivered by the second current source circuit during off period times of the pulse width modulation. This compensates the current drawn from the input and enables better timing control of the input current pulses.

Figure 1:
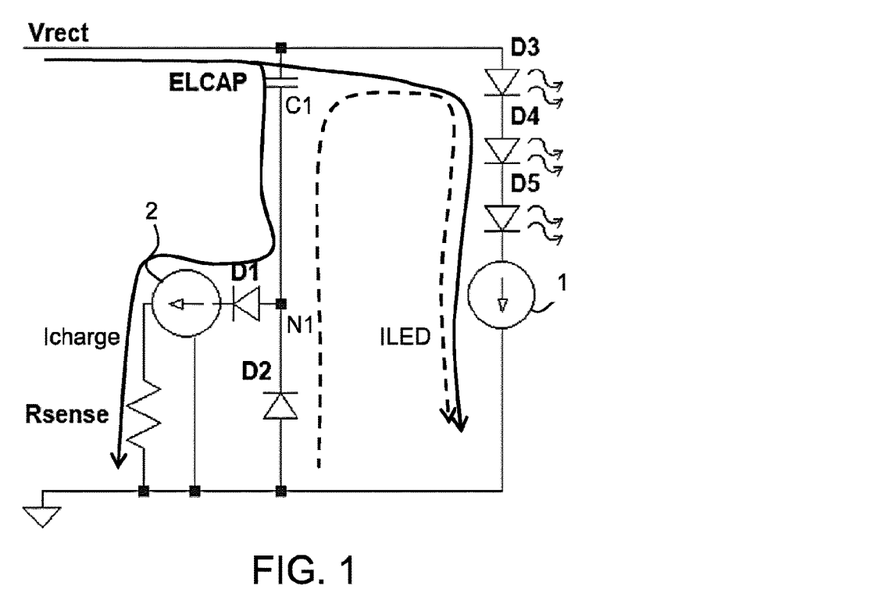
FIG. 1 shows a known linear LED driver.

FIG. 1 shows a known linear current driver circuit.

The input is a rectified mains signal Vrect. The input is provided to a LED string D3, D4, D5 in series with a first current source circuit 1 (which will simply be referred to as the first current source). The first current source drives a constant current through the LED string, but the current source is turned on and off using pulse width modulation (PWM).

A storage capacitor C1 is in parallel with the LED string and current source circuit. One end of the storage capacitor C1 connects to the input Vrect, and another end of the storage capacitor C1 connects to a node N1. This node connects to ground through a reverse direction diode D2, so that the series combination of the storage capacitor and the diode D2 is in parallel with the LED string and first current source 1. The node N1 connects to a second current source circuit 2, which will simply be referred to as a second current source, through a forward direction diode D1. This current flows through a current sense resistor Rsense.

The purpose of the storage capacitor C1 is to smooth the mains frequency ripple and the purpose of the pulse width modulation of the first current source 1 is to provide dimming control.

The PWM dimming control for example operates at 1 kHz, so that the first current source 1 turns on and off at 1 kHz. The duty cycle determines the average current flowing.

The circuit has a charging cycle and a discharging cycle.

The charging cycle takes place when the instantaneous voltage Vrect is greater than a smoothed voltage stored on the storage capacitor C1. During this time, the first current source 1 draws current from the input Vrect and the second current source 2 draws a charging current to the storage capacitor through diode D1. The diode D2 is off. The charge flows are shown by solid arrows.

The storage capacitor is thus charged with a constant current, of the second current source 2.

The discharging cycle takes place when the instantaneous voltage Vrect is less than a smoothed voltage stored in the storage capacitor C1. During this time, the first current source 1 draws current from the storage capacitor C1, with the charge flow shown by a dotted arrow. The diode D2 conducts in this phase and the diode D1 is off. The diodes thus effectively turn off the second current source 2 automatically (passively) in the discharging cycle based on the voltage at the input. The first current source is actively turned on and off.

The charging and discharging cycle of the storage capacitor C1 is at the mains 50 Hz or 60 Hz frequency, and it smooths out the 50 Hz or 60 Hz ripple. There remains a 1 kHz ripple in the LED current (because there is zero current when the first current source is off). If not compensated, this ripple is also present in the mains current.

Figure 2:
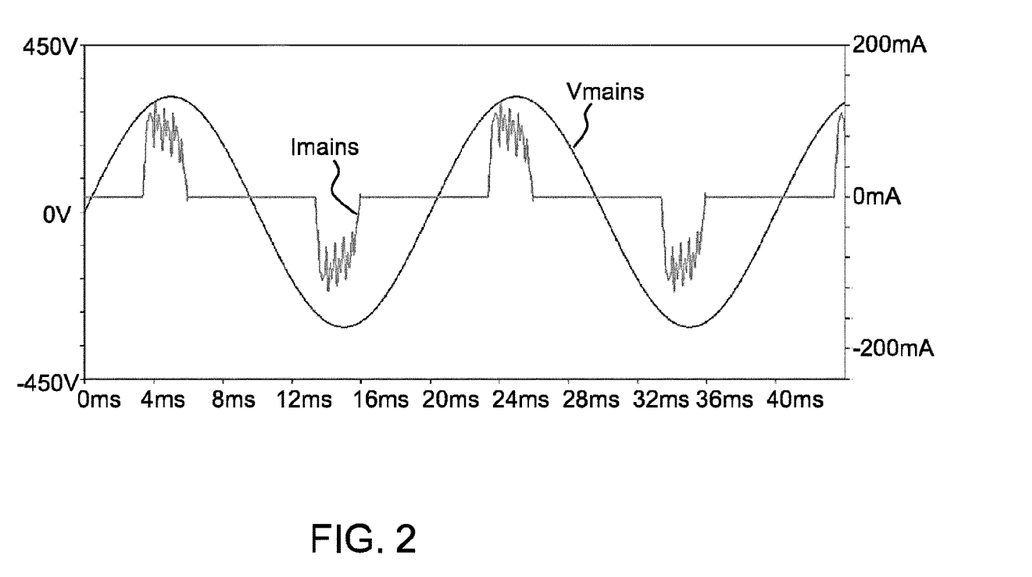
FIG. 2 shows the input current distortion resulting from the circuit of FIG. 1.

FIG. 2 shows the mains voltage Vmains (before rectification) and the current Imains drawn from the mains in the circuit of FIG. 1 (before rectification).

Each peak of the Imains signal is the time when the input voltage Vrect is larger than the voltage of on the storage capacitor C1. The rest of the time, the storage capacitor is providing the source of current which is drawn by the first current source 1.

The high frequency ripple can be seen in the input current. A particular problem arises because the fast switching frequency of the PWM control signal is not synchronized with the mains frequency. The result is that the phase angle of the current peaks relative to the rectified mains is not well controlled, in particular the timing of a peak in the current (a "peak angle") may result in regulatory requirements not being met.

Figure 3:
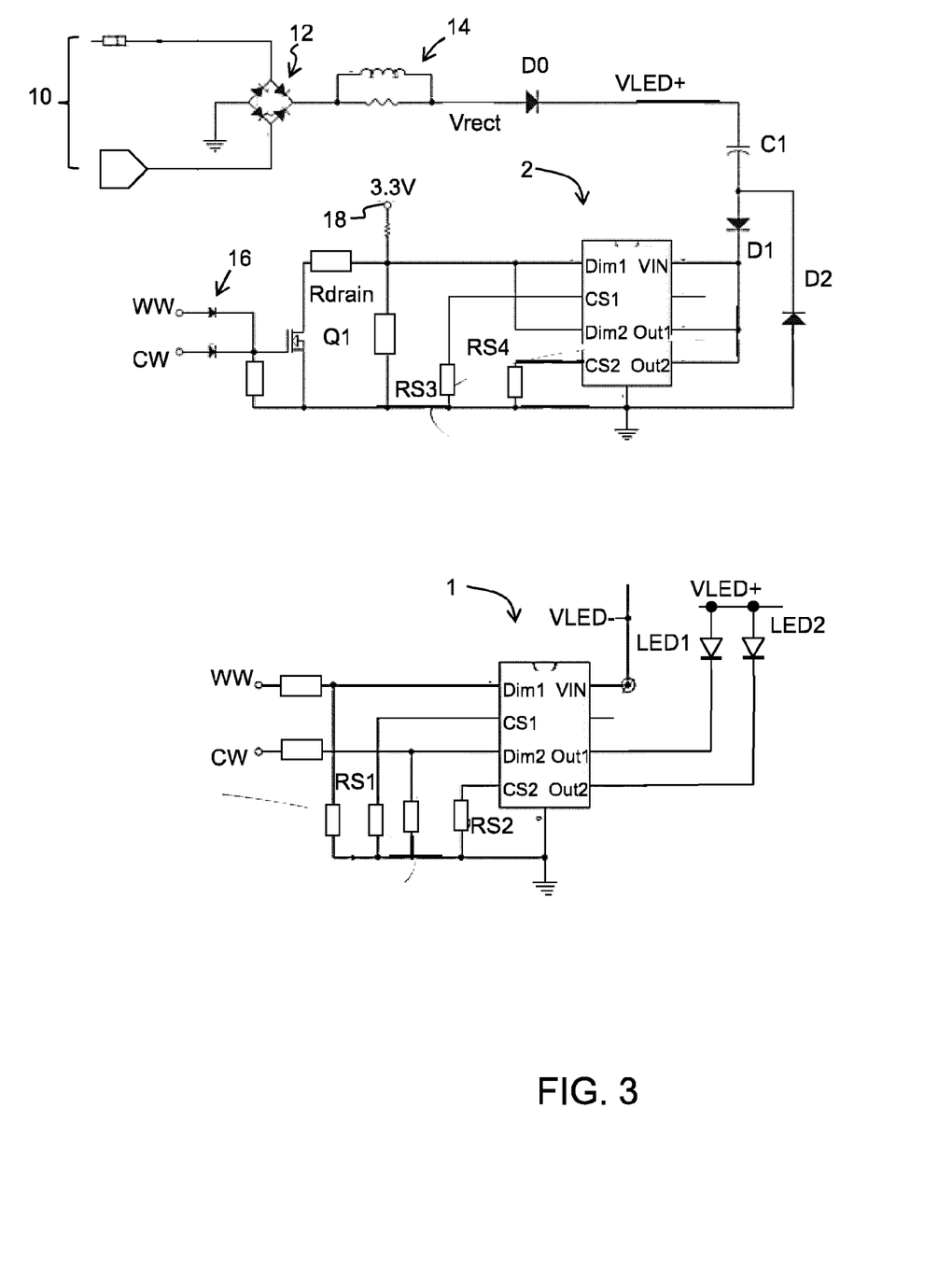
FIG. 3 shows a first example of a linear LED driver in accordance with the invention.

FIG. 3 shows one possible implementation of the circuit of FIG. 1 as well as a first modification in accordance with an example of the invention.

FIG. 3 shows the non-rectified mains input 10, a rectifier 12 and an EMI filter 14. The output of the filter is the rectified mains signal Vrect of FIG. 1. An input diode D0 is also shown.

The circuit comprises a first integrated circuit which implements the first current source 1 and a second integrated circuit which implements the second current source 2.

As shown at the first current source 1, this example has two LED strings, one string LED1 of warm white (WW) LEDs e.g. at 2200K and one string LED2 of cool white (CW) LEDs e.g. at 3000K. They connect between the LED supply voltage VLED+ and respective output pins of the integrated circuit. The two different color temperatures are mixed to provide control of the desired color temperature. The LED strings for example together form a LED filament bulb.

For this purpose, each string has its own PWM setting. This PWM setting is shown as WW and CW, and these settings are provided to dimming inputs of the first current source 1.

The modification of FIG. 3 is to use the PWM settings in the control of the second current source 2.

For this purpose, the second current source 2 has an input transistor Q1 which is turned on when either of the PWM inputs CW, WW is high. Thus, the transistor Q1 together with input diodes 16 form an off port. When Q1 is turned on, the dimming inputs to the current source 2 are pulled low. The resistor Rdrain in series with the drain of Q1 is pulled to ground via Q1 and gives a lower (default) charge current setting.

The effect of this is that the input current distortion compensation is not active. The charging current of the input capacitor has the normal charge setting.

When Q1 is turned off, the dimming inputs to the current source 2 are pulled high to a supply voltage 18 because the resistor Rdrain in series with the drain of Q1 is not pulled down to ground, so a higher current is active for the charging current source.

The effect of this is that the input current distortion compensation is active. The charging current of the input capacitor has the normal setting plus the sum of the LED currents (WW+CW).

WW and CW are switched in complementary manner so that in combination CW and WW have a 100% duty cycle at full brightness. For example, at full brightness WW=70% and CW=30%. When dimming to 90%, WW=63% and CW=27%, and this creates a distortion in the input current.

The circuit around Q1 performs a simple counter modulation of the current delivered by the second current source 2 via the PWM control of the LED strings. When no LED current is flowing through the mains input (i.e. WW and CW are zero) the charging current source is modulated with the extra LED current because the terminals Dim1 and Dim2 are pulled high by source 18.

In this way the input current distortion is compensated.

Thus, the transistor Q1 adapts the control of the second current source 2 to the dimming level defined by CW and WW. Extra current is provided when there is no LED current.

At full brightness, the transistor Q1 is on and the normal charging current setting is provided. Only when both signals WW and CW are zero is the compensation active.

The storage capacitor C1, and the diodes D1 and D2 are configured in the same way as shown in FIG. 1.

The current sources have current sensing inputs, one for each LED string. Current sense resistors RS1 and RS2 are shown for the first current source 1. The LED current of each LED string flows through its respective current sense resistor, so that the resulting voltage is a measure of the current flowing. The current sense resistors RS3 and RS4 are used to monitor the charging current, as represented in FIG. 1 by Rsense.

Each current source circuit has a ground pin. In the example of FIG. 3, each current source circuit is connected with its ground pin connected to actual ground.

Figure 4:
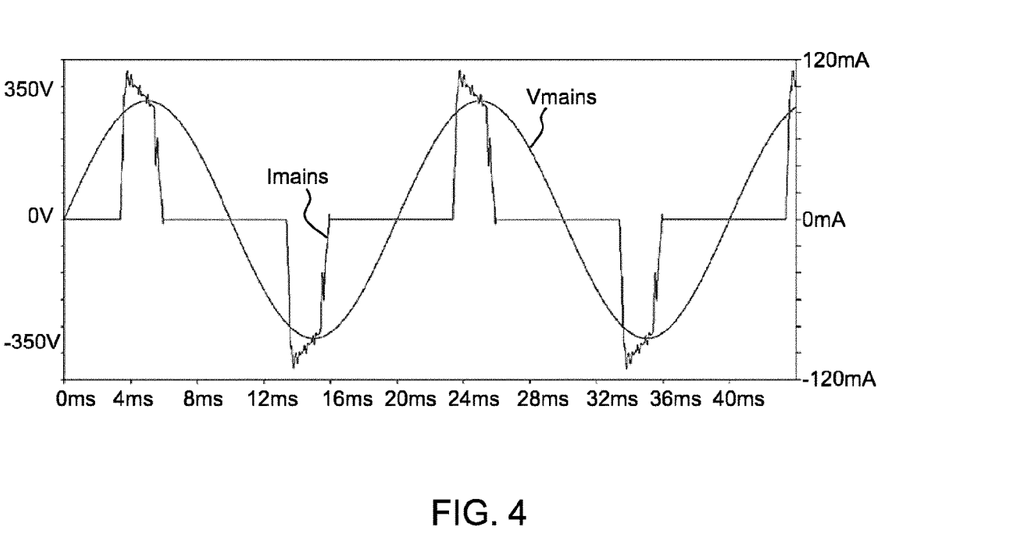
FIG. 4 shows the input current distortion resulting from the circuit of FIG. 3.

FIG. 4 shows the effect on the input current Imains for the circuit of FIG. 3.

Figure 5:
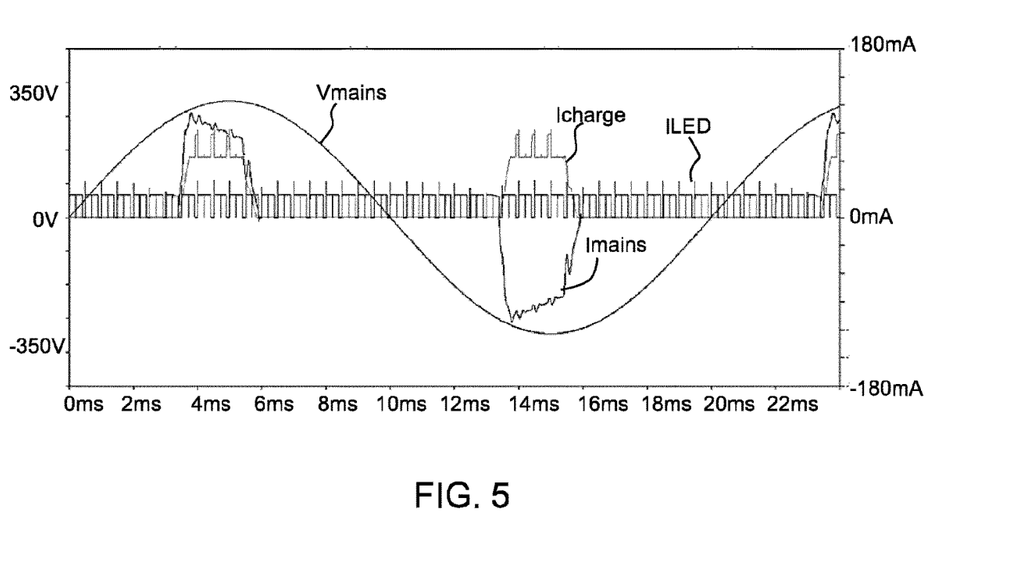
FIG. 5 shows further waveforms for the circuit of FIG. 3.

FIG. 5 additionally shows the charging current Icharge and the (total) LED current ILED. The charging current is no longer a constant value, but instead it has a 1 kHz ripple. In particular when the LED current is zero (so a low part of the PWM current is flowing through the LED strings) there is an increased charging current Icharge.

Figure 6:
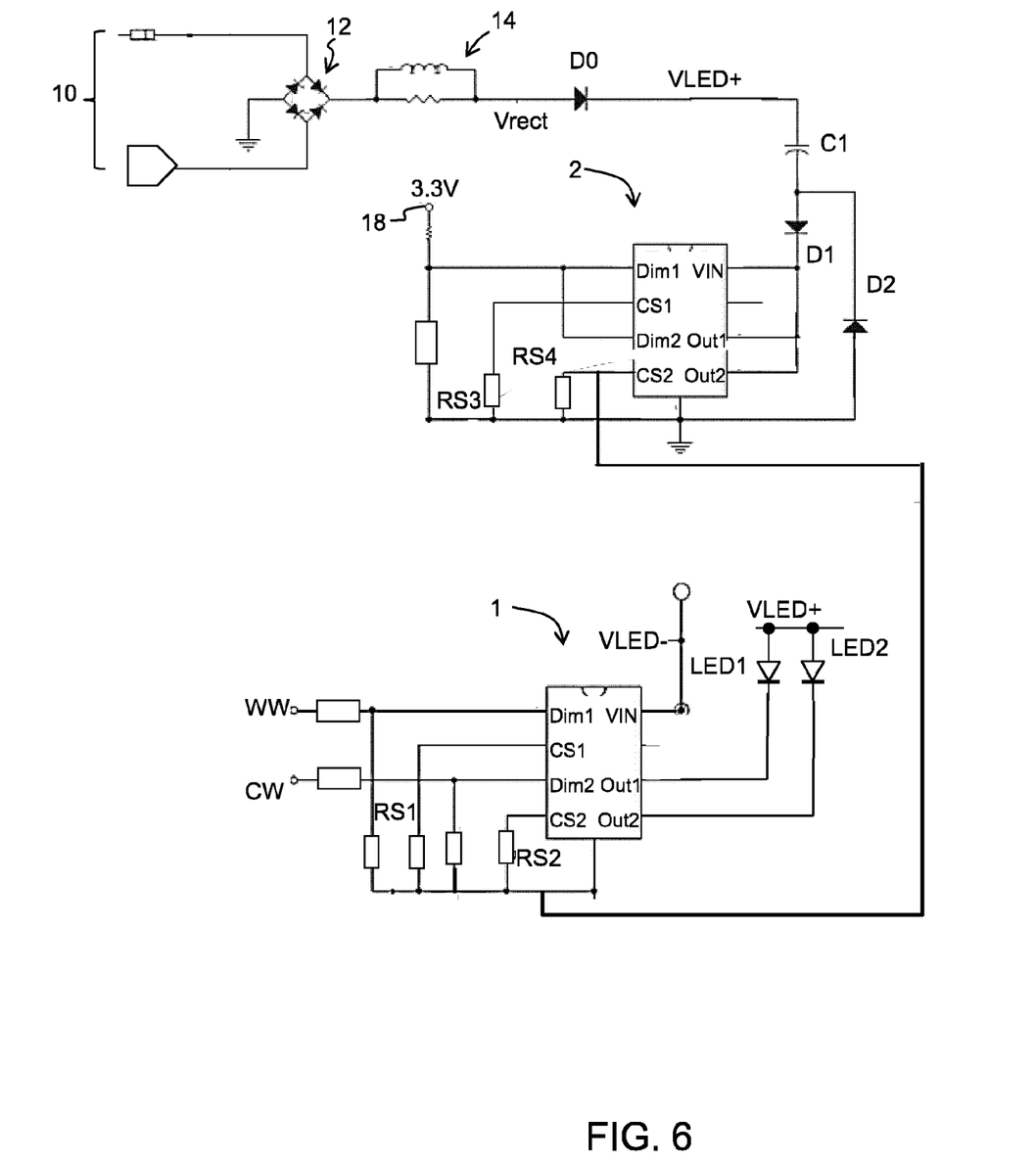
FIG. 6 shows a second example of a linear LED driver in accordance with the invention.

FIG. 6 shows an implementation of the circuit of FIG. 1 with a modification in accordance with a second example of the invention.

The second modification shown in FIG. 6 is to couple the ground pin of the first current source 1 to one of the current sense inputs of the second current source 2. Thus, there is a coupling between the first and second current source circuits.

The effect of this is to implement an addition of the sensed charge current and the sensed LED currents through RS1 and RS2 via the sense resistor RS4 of the charge current source.

In this implementation, the total current through RS3 and RS4 is monitored and used to control Icharge, so the sensed LED current can be added to either current sense input of the second current source 2.

When the LED current through the sense resistors RS1 and RS2 are zero, the charging current source detects this low sensed current, so the feedback control mechanism implemented by the current source 2 automatically adds extra current (corresponding to the LED current).

Thus, the charging current source is made to deliver additional current during times when the LED current is zero. In this way the input current distortion is further compensated.

Figure 7:
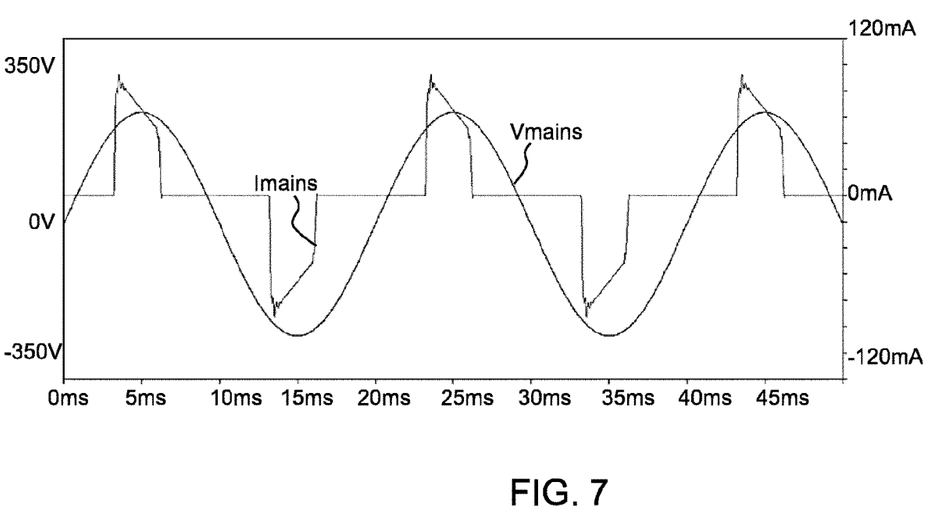
FIG. 7 shows the input current distortion resulting from the circuit of FIG. 6.

FIG. 7 shows the effect on the input current Imains for the circuit of FIG. 6.

Figure 8:
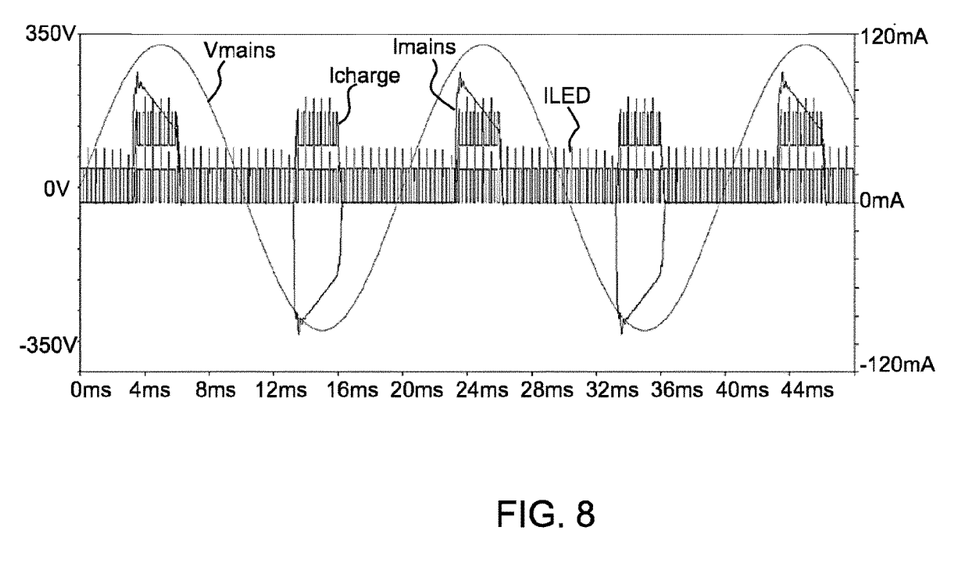
FIG. 8 shows further waveforms for the circuit of FIG. 6.

FIG. 8 additionally shows the charging current Icharge and the (total) LED current ILED. The charging current is again no longer a constant value, but instead it has a 1 kHz ripple. In particular when the LED current is zero (so a low part of the PWM current flowing through the LED strings) there is an increased charging current Icharge.

Figure 9:
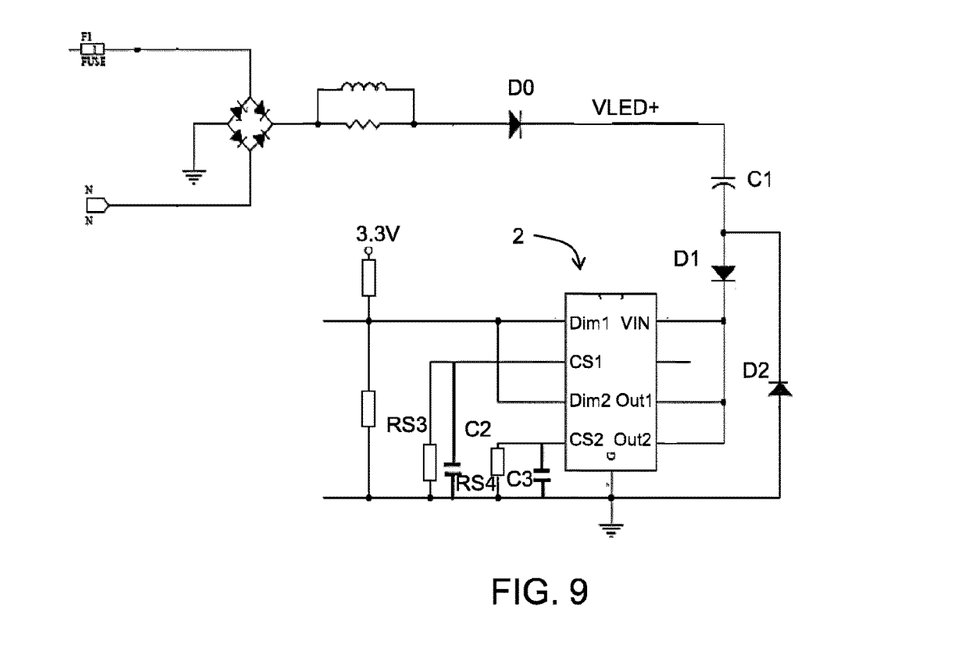
FIG. 9 shows a third example of a linear LED driver in accordance with the invention.

FIG. 9 shows a further alternative approach.

The first current source 1 remains conventional, as in FIG. 3, i.e. there is no coupling between the current sense input of the second current source 2. Furthermore, the first current source 1 has its ground pin connected to ground. The first current source is thus not shown.

As explained above, the second current source circuit 2 comprises a control input for setting a current level (in the example shown there are two, CS1 and CS2), based on the voltage across a resistor between a ground terminal and the control input (in the example shown there are two, RS3 and RS4).

The modification of FIG. 9 is to provide a compensating capacitor in parallel with the resistor, and in this example there are thus two compensating capacitors C2, C3.

The addition of a compensating capacitor creates a filter circuit, in particular a differentiator circuit, and this shifts the peak of the input current peak to the start of the current waveform. Thus, the effect is to shift and increase the peak of the input current distortion such that the peak angle requirements are able to be met. Each current sense resistor and its associated compensating capacitor for example form a circuit with a cutoff frequency greater than two times the PWM frequency.

This provides a peak pulse injection in the charge current source via analogue control. When the charging current source starts charging the capacitor C1, the initial current set point is increased via the differentiator capacitors C2, C3. In this way the input current distortion is not improved, but the peak angle is shifted towards the start of the input current to fulfil the regulatory requirements.

Figure 10:
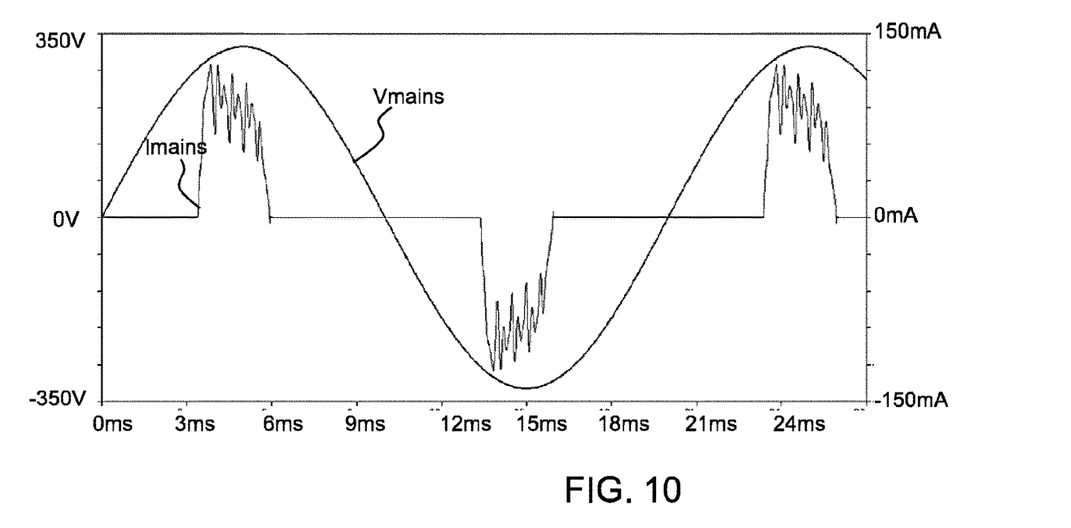
FIG. 10 shows the input current distortion resulting from the circuit of FIG. 9.

FIG. 10 shows the effect on the input current Imains.

Figure 11:
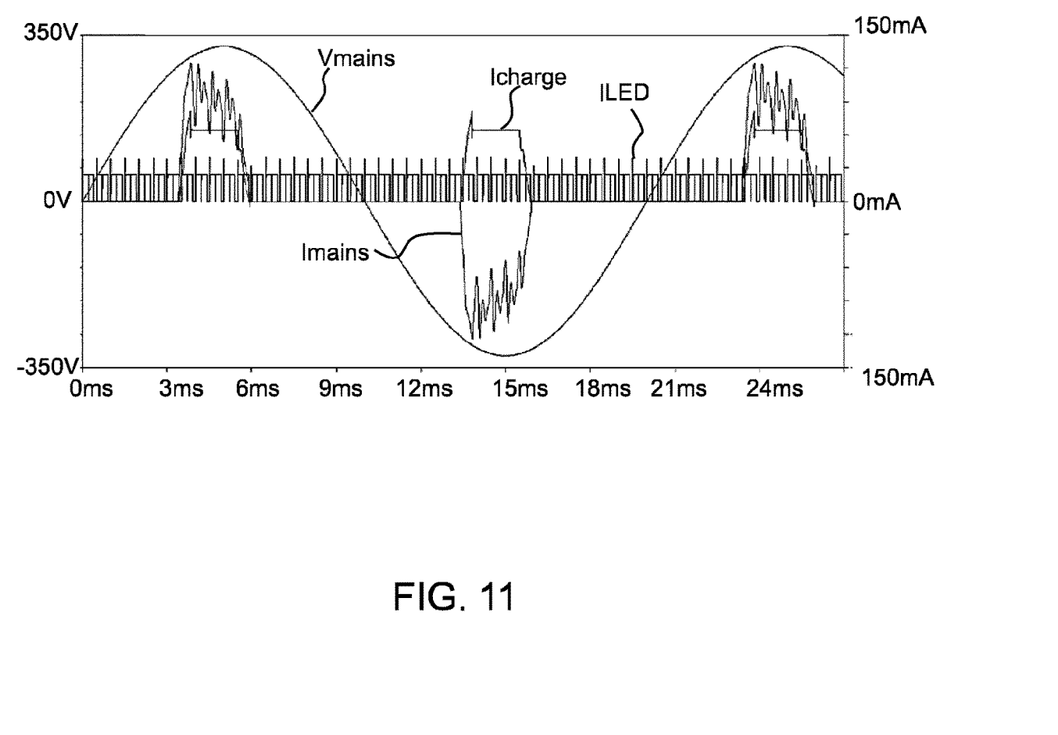
FIG. 11 shows further waveforms for the circuit of FIG. 9.

FIG. 11 additionally shows the charging current Icharge and the (total) LED current ILED. The charging current is again no longer a constant value, but instead it has an initial peak.

All three examples above involve increasing the current delivered by the second current source circuit during off period times of the pulse width modulation (relative to the current during on period times of the pulse width modulation). Thus, they all have the desired effect of controlling the timing of the peak of the mains current pulses. The current source circuits are for example ICs BP5578EJ.

The examples above use two LED strings, with two PWM signals and two current sensing feedback loops. Of course, the circuit may be implemented with one LED string, such as shown in FIG. 1.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A LED driver circuit comprising:
an input-adapted to receive a rectified mains input signal;
a storage capacitor, coupled to the input;
a first current source circuit adapted to set an output current, wherein the first current source circuit is controlled by pulse width modulation with on periods and off periods, and wherein the first current source circuit and the storage capacitor form a capacitor discharging loop;
a charging circuit adapted to charge the storage capacitor, comprising a second current source circuit, wherein the second current source circuit and the storage capacitor form a capacitor charging loop; and
a compensating arrangement adapted to increase the current delivered by the second current source circuit during off period times of the pulse width modulation, wherein the compensating arrangement comprises a coupling between the first and second current source circuits,
wherein the first current source circuit comprises a first control input adapted to set a current level, based on the voltage across a first resistor between a ground terminal and the first control input, and the second current source circuit comprises a second control input adapted to set a current level, based on the voltage across a second resistor between a virtual ground terminal and the second control input, wherein the compensating arrangement comprises a coupling between the virtual ground terminal and the first control input.

2. The driver circuit of claim 1, wherein the compensating arrangement is adapted to increase the current delivered by the second current source circuit during off period times of the pulse width modulation only while a current is being drawn from the input.

3. The driver circuit according to claim 1, wherein the second current source circuit comprises a first control input adapted to set a current level, based on the voltage across a first resistor between a ground terminal and the first control input, wherein the compensating arrangement comprises a compensating capacitor in parallel with the first resistor.

4. The driver circuit according to claim 3, wherein the first resistor and the compensating capacitor form a circuit with a cutoff frequency greater than two times a PWM frequency.

5. The driver circuit according to claim 1, comprising a first diode in the charging loop and a second diode in the discharging loop.

6. The driver circuit of claim 5, wherein the first and second diodes connect to a node with opposite polarity.

7. A lighting arrangement comprising:
the driver circuit of claim 1; and
a LED arrangement to which the output current is delivered.

8. The lighting arrangement of claim 7, wherein the LED arrangement comprises a LED filament bulb.

9. A LED driver circuit comprising:
an input adapted to receive a rectified mains input signal;
a storage capacitor, coupled to the input;
a first current source circuit adapted to set an output current, wherein the first current source circuit is controlled by pulse width modulation with on periods and off periods, and wherein the first current source circuit and the storage capacitor form a capacitor discharging loop;
a charging circuit adapted to charge the storage capacitor, comprising a second current source circuit, wherein the second current source circuit and the storage capacitor form a capacitor charging loop; and a compensating arrangement adapted to increase the current delivered by the second current source circuit during off period times of the pulse width modulation,
wherein the compensating arrangement comprises a compensating circuit adapted to set the current of the second current source in dependence on the pulse width modulation setting of the first current source circuit, wherein the compensating circuit comprises a transistor adapted to pull a control terminal of the second current source high or low in dependence on the pulse width modulation setting of the first current source circuit.

* * * * *